United States Patent Office 3,540,793
Patented Nov. 17, 1970

3,540,793
PHOTOCHROMIC POLARIZING GLASSES
Roger J. Araujo, Corning, N.Y., William H. Cramer, Yakima, Wash., and Stanley D. Stookey, Corning, N.Y., assignors to Corning Glass Works, Corning, N.Y., a corporation of New York
No Drawing. Filed July 3, 1968, Ser. No. 742,151
Int. Cl. G02b 1/08
U.S. Cl. 350—147          6 Claims

ABSTRACT OF THE DISCLOSURE

Light polarizing glasses are found to be capable of reversibly changing from the clear unpolarized to the darkened polarized state upon exposure to actinic radiation. These glasses are comprised of a silicate glass body having elongated silver halide particles incorporated therein.

---

The most common polarizer now in use, developed by E. H. Land, is a plastic material designated as "H-sheet." This polarizer, which appears neutral in color when viewed in unpolarized light, is made by absorbing iodine in a stretched sheet of polyvinyl alcohol. Once attached the iodine tends to form long thin chains embedded in the transparent sheet of plastic material. The H-sheet remains "permanently" polarizing whereby we means that the material does not tend to change from the polarized to the unpolarized state and vice versa.

A brief discussion of polarization is helpful in understanding our invention. According to the wave theory, light generally travels in a transverse direction with electric vibrations being perpendicular to the line of propagation. Polarized light is light whose transverse vibrations have a simple pattern and more specifically, when the electrical vibrations are horizontal, the light is considered to be polarized linearly and horizontally, and on the other hand, when the vibrations are vertical, the light is considered to be polarized linearly and vertically. As an illustration, a beam of light is passed through a first polarizer which divides the light into two components, one component being transmitted while the other component is absorbed. Thereafter as the light is passed through a second polarizer, maintained parallel to the first, the polarized light is transmitted. But as the second polarizer is turned, the amount of light transmitted decreases until when the polarizers are at right angles to each other, the light is almost totally absorbed.

A very common use of plastic polarizing sheet is in the making of sunglasses which substantially reduce glare. Recently, it was found that sunglasses could be made from a photochromic glass that reversibly darkens in the presence of sunlight and returns to a neutral color indoors. Now we have discovered a silicate glass which provides a combination of both properties, such that in the presence of sunlight, i.e. actinic radiation, it is both darkened and polarizing, while indoors it returns to the colorless and nonpolarizing state. The use generally of glass polarizers has advantages over the plastics heretofore used in that the glass tends to be rigid and thermally stable. More important, the plastics have a low hardness and poor scratch resistance, as well as low refractive index, which prevents the manufacture of prescription polarized sunglasses.

It is, therefore, an object of the present invention to provide a glass polarizing material.

Another object of the invention is to provide a material which is reversibly polarizing and capable of almost indefinitely transforming to and from the polarized state.

In accordance with the present invention we have discovered a photochromic polarizing glass capable of reversibly changing from the nonpolarizing to the polarizing state which is comprised of a silicate glass body having incorporated therein elongated particles of at least one silver halide, the concentration of said particles being 0.2–0.7 percent by weight and the glass being polarizing in the darkened state. The glass is made polarizing by stretching the silicate glass containing the silver halide particles to elongate and orient the particles and then subjecting the glass body to actinic radiation.

The basic disclosure relative to photochromic glasses is set forth in Armistead et al. U.S. Pat. No. 3,208,860. An illustration of such glasses are inorganic silicate glasses containing submicroscopic crystals of the silver halides, viz., silver chloride, silver bromide, and silver iodide, which become darker in color when the glass is subjected to actinic radiation, but which regain their original color when the actinic radiation is removed. While this phenomenon is not fully understood, it is believed to be the result of a reaction occurring between the actinic radiation and the crystals dispersed in the glassy matrix, the absorptive qualities of the crystals to visible radiations being altered thereby. The removal of the actinic radiation allows the crystals to return to their original state because these crystals are encased in a glassy matrix which is inert and impermeable to the reaction products developed upon such exposure, and thus the reaction products cannot diffuse away from the site of the reaction. The capability of these glasses to reversibly vary the transmission of visible light has suggested their utility in windows, ophthalmic lenses, building siding materials, and the like.

A range of preferred base glass compositions useful in the present invention are those disclosed in the above patent, in the system $R_2O \cdot B_2O_3 \cdot Al_2O_3 \cdot SiO_2$, where $R_2O$ designates the alkali metal oxides. More specifically, these glasses consist essentially, by weight on the oxide basis, of about 40–76% $SiO_2$, 4–30% $B_2O_3$, 4–26% $Al_2O_3$, and $R_2O$ being present in the indicated proportion selected from the group consisting of 2–8% $Li_2O$, 4–15% $Na_2O$, 6–20% $K_2O$, 8–25% $Rb_2O$, and 10–30% $Cs_2O$, the sum of the recited base constituents plus the silver and the halogens being at least 85% of the entire glass composition. Addition of very small amounts of low temperature reducing agents such as SnO, FeO, $Cu_2O$, $As_2O_3$, and $Sb_2O_3$ to enhance the photochromic behavior of the glass are also described, these amounts generally totalling less than 1% by weight. Finally, incorporation of fluorine in the glass batches to aid melting or to inhibit devitrification as the glass melt is cooled and shaped, as well as minor additions of bivalent metal oxides such as MgO, CaO, SrO, BaO, ZnO, and PbO are also disclosed therein.

It can readily be appreciated that the optical density obtainable in photochromic glasses is directly related to the concentration of radiation-sensitive crystals therein. Nevertheless, as is pointed out in Pat. No. 3,208,860, high concentration of silver and halides in the glass result in the formation of silver halide crystals of such large size as to scatter light from the visible portion of the spectrum passing therethrough and, in so doing, cause the glass to become translucent or opaque. The quantity limitations of silver and halides found applicable in that patent to assure the production of a transparent photochromic glass comprise a maximum of 0.7% and 0.6% by weight as analyzed, respectively, of silver and the sum of the halides. On the other hand, photochromic polarizing behavior in glass can be observed where the concentration of radiation-sensitive crystals is as little as 0.2% by weight.

The photochromic glass used herein is made by incorporating the constituents of the desired crystalline silver halide phase in the glass and thereafter precipitating such crystals in situ in the glassy matrix. The glass is melted from batches in the conventional manner and formed to the desired shape and cooled according to the usual procedures employed in glass working, the constituents of the desired silver halide being added to the batch along with the constituents of the glassy matrix. Precipitation of the silver halide particles can be effected by cooling the glass directly from the melt. It is possible to cool the glass rapidly enough so that no crystals of the desired silver halides or at least not in a sufficient number thereof, are precipitated to produce a noticeable photochromic effect in the glass. This result can be remedied by exposing the glass to a temperature above its strain point for a time sufficient to allow the silver cations and the halide anions to rearrange themselves within the glass structure to a condition of closer proximity whereby they will form a second amorphous phase consisting of submicroscope droplets of liquid silver halide. These droplets comprise silver halides in an amount of at least equal to 0.2% by weight of the glass and the silver halide will crystallize upon cooling below the melting point of the silver halide particles. The higher the temperature of the heat treatment, the more rapidly the rearrangement proceeds since the viscosity of the glass decreases with increases of temperature and the resistance to movement accomplishing the rearrangement will be decreased. After crystallization, the silver halide particles should have a diameter equal to about 50–1000 A. in order to obtain the desired polarizing properties in the final product. When the particles exceed 300 A. in diameter, the glasses start to lose their transparent properties which is particularly significant for glasses intended for ophthalmic uses.

In order to make the photochromic glass polarizing it is necessary to elongate and orient the silver halide particles of proper size in the glass matrix. The glass is now subjected to a stretching step at elevated temperatures to permit the glass to be pulled without breakage. Heating is preferably to a uniform temperature of 500–550° C. and it is possible even to go up to 600° C. depending upon the properties of the base glass. During stretching the particles are elongated such that the length to width ratio of the silver halide particles is in the range of about 2:1–5:1. Stretching also produces orientation of the silver halide particles in the direction in which the glass is being pulled whereby the silver halide particles in the form of fibrils tend to be all aligned in one direction. In the darkened state the glass product will preferentially absorb the light polarized in the direction of their alignment.

In another embodiment of the invention photochromic polarizing glasses are formed by coolnig the melt to about 800° C. and drawing the viscous melt. Using this procedure the cooling, crystallization and elongation occur almost simultaneously.

Elongation of the silver halide particles is brought about by laminar shear forces present during redrawing. The degree of elongation attained in combination with population density probably determines the polarization efficiency achieved. It is convenient to evaluate degree of polarization by the polarization ratio normalized into an efficiency factor using the formula:

$$\text{Efficiency } \% = \frac{T_{11} - T_1}{T_{11} + T_1}$$

where $T_{11}$ is the percent of transmission of polarized light with its electric vector parallel to that of the sample, and $T_1$ is the percent of transmission of polarized light with its electric vector at right angles to that of the sample.

The primary factors influencing the particle elongation of the silver halides are the particle size, the redrawing speed and the redrawing temperature. In general, larger particles are more easily elongated than smaller ones because of the relationship between the surface tension of the particles and the surface area being acted on by shear forces. However, particles larger than about 300–500 A.

diameter cause the glass to be quite hazy and unfit for ophthalmic use. It has been generally observed that at any given temperature of most efficient polarization is produced at the maximum obtainable redraw speed. This may be explained by the fact that glass redrawn at higher speeds cools more quickly as it leaves the furnace causing a setting of the elongated silver halide particles. As a corollary, at any given redraw speed, the lowest attainable temperature produces the highest degree of polarization. The reason is two fold. First, glass at higher viscosity exerts greater shear forces on the particles during the redrawing which causes greater particles elongation and second, as the redrawing temperatures are lowered, the glass is at a lower temperature when it is drawn from the furnace thus causing the freeze in of polarizing properties more quickly.

The actual elongation of silver halide particles may be accomplished under a variety of redrawing conditions such that the glass is at a viscosity of $10^8$–$10^{13}$ poises. However, at higher temperatures corresponding to glass viscosities in the range of $10^8$–$10^{10}$ poises the polarization properties produced within the active redrawing section of the glass decay very quickly as the glass emerges from the furnace. As the viscous flow of the glass falls below a certain rate, the surface tensional forces of the elongated particles begins to equal and then exceed the laminar shear forces exerted by the flowing glass. This causes the particles to tend to resume their original spherical shapes and is terminated only when the temperature of the glass falls below the annealing point. Thus, at higher redrawing temperatures very quick cooling is necessary to freeze in the polarization properties. This requirement for rapid cooling becomes increasingly difficult with thicker pieces of glass.

The stretched glass must be cooled to set the elongated and oriented silver halide particles in the glass matrix. The degree or rapidity of cooling depends of course upon the temperature at which the glass was originally redrawn. Thus, glasses redrawn at higher temperatures and lower viscosities must be cooled more rapidly whereas those glasses redrawn at temperatures close to the annealing point will tend to set the elongated particles and require a less rapid degree of cooling. In most instances the glass is removed from the furnace and permitted to cool at room temperature.

Our invention is further illustrated by the following examples.

EXAMPLE I

An I-shaped sample of glass having a cross section of four inches by ½ inch and four inches long was prepared from the following glass composition as calculated from the batch on the oxide basis:

| | Weight percent | Mole percent |
| --- | --- | --- |
| Ingredient: | | |
| $SiO_2$ | 51.234 | 54.049 |
| $Al_2O_3$ | 7.677 | 4.772 |
| $Na_2O$ | 8.654 | 8.845 |
| F | 1.152 | 3.842 |
| CuO | 0.027 | 0.021 |
| Cl | 0.267 | 0.477 |
| Br | 0.597 | 0.473 |
| Ag | 0.097 | 0.057 |
| CdO | 0.084 | 0.041 |
| $B_2O_3$ | 30.077 | 27.365 |

The glass was subjected to a heat treatment of 700° C. for 1 hour to develop large silver halide crystals of about 500–1000 A in diameter.

The sample was then clamped and placed in a horizontally aligned redrawing furnace, and heated to a temperature of 550° C. corresponding to a glass viscosity of $10^{9.7}$ poises. A tensile force was then applied to the glass sample in the direction of its longitudinal axis using clamps and chains actuated and controlled by a hydraulic cylinder. The tensile force was increased uniformly to 500 pounds (250 p.s.i. on the actual sample having an initial cross section of 2 square inches).

Elongation to 16 inches (4:1) was then effected over a period of 15 minutes such that the effective cross section of the sample was reduced to ½ in.$^2$. At this point the elongation of the glass was stopped and the furnace opened for rapid cooling of the sample.

The elongated sample was ground and polished to 2 mm. thickness and the following measurements were obtained:

$T_{11}$=13.0%
$T_1$=1.0% and transmission in undarkened state=77%.

The efficiency as calculated from the equation set forth hereinabove was found to be 86%.

EXAMPLE II

A redraw apparatus with traction devices capable of exerting sufficient pull on the glass to elongate it at a viscosity in the range of $10^8$ to $10^{13}$ poises was arranged. The basic apparatus used consisted of a vertically aligned furnace, a movable clamping mechanism capable of holding the glass sample and lowering it at various rates into the top of the furnace and a traction device capable of exerting sufficient pull on the glass emerging from the bottom of the furnace to continuously redraw the glass at the required viscosity levels.

Various glasses were melted according to conventional techniques as set forth in the table below wherein the composition is given in weight percent on the oxide basis as calculated from the batch.

TABLE

| Constituent | Ex. II | Ex. III | Ex. IV | Ex. V | Ex. VI | Ex. VII | Ex. VIII | Ex. IX | Ex. X | Ex. XI | Ex. XII | Ex. XIII |
|---|---|---|---|---|---|---|---|---|---|---|---|---|
| $SiO_2$ | 53.1 | 54 | 49.6 | 50.0 | 50.0 | 51.6 | 46.6 | 61.4 | 53.8 | 53.8 | 58 | 59 |
| $Al_2O_3$ | 8.0 | 8.2 | 9.0 | 9.0 | 9.0 | 7.0 | 7.0 | 22.4 | 10.4 | 10.4 | 9 | 9 |
| $B_2O_3$ | 29.5 | 30.0 | 30.0 | 30.0 | 30.0 | 20.0 | 25.0 | | 28.2 | 22.2 | 19.0 | 17.0 |
| $Na_2O$ | 8.3 | 9.1 | 10.0 | 10.0 | 10.0 | 2.0 | 2.0 | 6.5 | 4.1 | 8.1 | 10 | 2 |
| $K_2O$ | | | | | | | | | .412 | .412 | 1.0 | |
| $Li_2O$ | | | | | | 2.5 | 2.5 | 4.0 | 2.8 | 2.8 | | 3 |
| $Cs_2O$ | | | | | | | 4.0 | | | | | |
| MgO | | | | | | | | 2.0 | | | | |
| BaO | | | | | | 8.0 | 8.0 | 2.5 | | | | |
| PbO | | | | 1.0 | 4.5 | 4.5 | 4.5 | 0.5 | 1.0 | 1.0 | 1.5 | 4.0 |
| $ZrO_2$ | | | | | | 2.0 | 2.0 | | | | | |
| $Sb_2O_3$ | | | | | | | | 0.3 | | | | |
| Ag | 0.09 | 0.09 | 0.15 | 0.30 | 0.25 | 0.3 | 0.3 | 0.5 | 0.05 | .70 | .2 | .26 |
| F | 0.6 | 1.23 | 1.3 | 1.3 | 1.3 | 1.35 | 1.35 | 2.5 | 0.5 | 0.5 | 1.5 | .3 |
| Cl | 0.19 | 0.36 | 0.3 | 0.40 | 0.60 | 0.4 | 0.4 | 1.5 | | .20 | .4 | .4 |
| Br | 0.08 | 0.18 | 0.3 | 0.20 | | 0.2 | 0.2 | | | .20 | .44 | .13 |
| I | | | | | | | | | | .5 | | |
| CuO | 0.07 | 0.06 | 0.06 | 0.03 | 0.03 | 0.03 | 0.03 | .016 | .032 | .032 | .02 | .03 |
| CdO | 0.06 | 0.09 | 0.15 | 0.50 | 0.10 | 0.20 | 0.20 | | | | | |
| Efficiency | 30 | 40 | 50 | 60 | 55 | 35 | 50 | 20 | 60 | 45 | 40 | 35 |

The glasses were initially subjected to a heat treatment of 700° C. for 30 minutes to grow the photochromic silver halide droplets. Samples of glass were prepared having the dimensions of 2" x 8" x ⅜". These were slowly lowered into the redraw furnace, preheated approximately to the softening point of the glass. The temperature of the furnace was about 600° C. and the force of redraw was created by a 20 pound weight. After the redrawing was begun the furnace temperature was lowered to correspond to a glass viscosity of $10^{12}$ to $10^{13}$ poises. Under these conditions attenuation of 4:1 during redrawing yielded a continuous strip of glass ½" wide by ⅛" thick.

In the product obtained the photochromic properties as measured before redrawing and after redrawing are not appreciably changed. The silver halide particles have been elongated to an ellipsoidal configuration with an aspect ratio in the range of 2:1 to 5:1. The glass becomes polarizing after being subjected to actinic radiation in the range of 350–410 millimicron wave length which causes an increase in the optical density typical of the darkening of photochromic glasses. Polarization efficiency increases proportionally with optical density until the maximum optical density is reached. The efficiency as calculated from the equation is given in the table above.

We claim:
1. A photochromic polarizing glass capable of reversibly changing from a clear nonpolarizing state to a darkened polarizing state, said glass comprising a silicate glass body having incorporated therein 0.2–0.7% by weight of submicroscopic particles of at least one silver halide, said particles being elongated to a length to width ratio of 2:1–5:1 and oriented parallel with respect to one another in the direction of elongation, and said glass being in the darkened polarizing condition after exposure to actinic radiation.

2. The silicate glass of claim 1, consisting essentially in weight percent as calculated from the batch of silica 40–76%, boric oxide 4–30%, alumina 4–26%, and $R_2O$ being present in the indicated proportion selected from the group consisting of 2–8% $Li_2O$, 4–15% $Na_2O$, 6–20% $K_2O$, 8–25% $Rb_2O$, and 10–30% $Cs_2O$, the sum of recited base constituent plus the silver halide being at least 85% of the entire glass composition.

3. The glass of claim 2, containing additionally up to 1% by weight of a member selected from the group consisting of SnO, FeO, $Cu_2O$, $As_2O_3$, $Sb_2O_3$ and mixtures thereof.

4. The glass of claim 2, containing additionally up to 12.5% by weight of a bivalent metal oxide selected from the group consisting of MgO, CaO, SrO, BaO, ZnO, PbO, and mixtures thereof.

5. The glass of claim 2, wherein said silver halide is a member selected from the group consisting of silver chloride, silver bromide, silver iodide and mixtures thereof.

6. The glass of claim 5, wherein said glass additionally contains 0–0.10% by weight CuO and 0–0.50% by weight of CdO.

References Cited

UNITED STATES PATENTS 3,208,860  9/1965  Armistead et al. __ 350—160 X
3,402,979  9/1968  Pao et al. _____ 350—147
3,443,854  5/1969  Weiss _____ 350—147

DAVID SCHONBERG, Primary Examiner

P. R. MILLER, Assistant Examiner

U.S. Cl. X.R.

65—66; 106—52; 350—154, 160